H. ROSENBERG.
ANCHOR BOLT SHELL.
APPLICATION FILED JAN. 26, 1914.

1,099,668.

Patented June 9, 1914.

Witnesses:
E. A. Jarvis
Ruth Meyers

Inventor:
Heyman Rosenberg
by Maurice Block
attorney.

UNITED STATES PATENT OFFICE.

HEYMAN ROSENBERG, OF NEW YORK, N. Y., ASSIGNOR TO PARKER SUPPLY COMPANY OF NEW YORK, N. Y., A CORPORATION OF NEW YORK.

ANCHOR-BOLT SHELL.

1,099,668.

Specification of Letters Patent.

Patented June 9, 1914.

Application filed January 26, 1914. Serial No. 814,497.

*To all whom it may concern:*

Be it known that I, HEYMAN ROSENBERG, a citizen of the United States of America, residing at New York city, borough of Manhattan, county and State of New York, have invented certain new and useful Improvements in Anchor-Bolt Shells, of which the following is a full, clear, and exact description.

This invention relates to an improvement in expansion-bolt shells, the object being to provide an article of this nature by which means an object can be secured to a support by simply boring a hole in the support and inserting the expansible shell of the bolt and then inserting a wood or machine-screw.

My improved shell is preferably made out of soft material in order that the screw will cut its own thread in the wall of the shell as it travels inwardly. To facilitate the cutting of the thread I place in the bore of the shell a plurality of projections, preferably independent and separated one from the other, the said projections acting as a portion of a female thread which the threads of the screws will engage when the said screws are inserted and before the said screws are rotated to cut their own thread. The projections act to prevent the inserted screw from backing off when it is rotated.

Further features of improvement will hereinafter appear.

Figure 1:
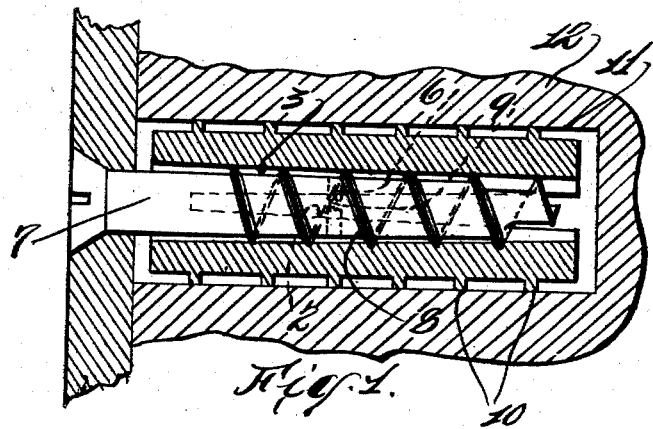
Figure 2:
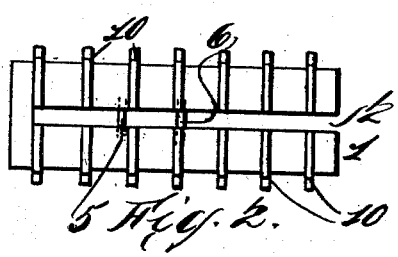
Figure 3:
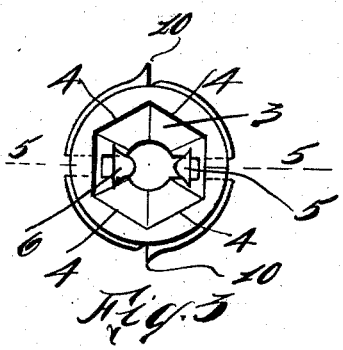
Figure 4:
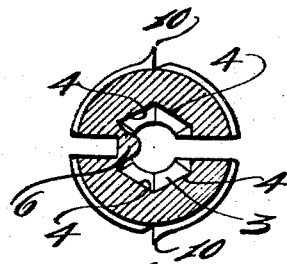
Figure 5:
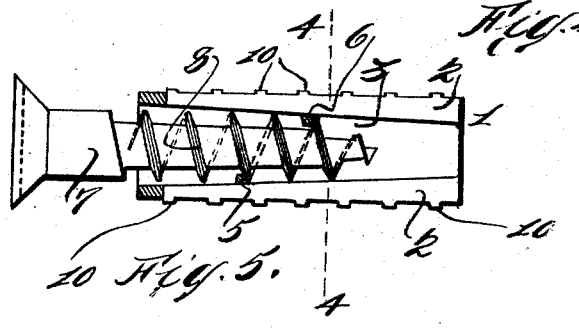

I will now proceed to describe my invention in detail, summarizing its essential features in the appended claims, reference being had to the accompanying drawing, wherein:

Figure 1 is a longitudinal sectional view of my improved anchor-bolt-shell, in position in a support; Fig. 2 is a detail elevation of the shell; Fig. 3 is an enlarged end view thereof; Fig. 4 is a cross-sectional view, the section being taken on a line 4—4 in Fig. 5; and Fig. 5 is a detail sectional plan view of the shell, the section being taken on a line 5—5 in Fig. 3, the screw being shown in elevation.

As herein illustrated my improvement consists of a shell 1 of relatively soft material slotted as at 2 for the greater part of its length, the said shell having a bore 3 extending from end to end; the said bore being tapered and having a wall hexagonal in shape, whereby flat surfaces 4 are provided. At intervals within the bore 3 I place projections 5 and 6 which are made integral with the shell and extend across the slots 2; that is to say, each slot 2 is crossed by a projection. The projections 5 and 6 hold the shell from expanding, but are adapted to break when the shell is expanded by the screw 7. The projections 5 and 6 also act to prevent the screw 7 from backing off when said screw is rotated, for the reason that the said projections will engage the thread of the screw (see Fig. 5) when the screw is inserted in the shell and partly rotated.

When the screw is rotated the projections 5 and 6 will act in the nature of a nut and cause the screw to travel inwardly. As the screw travels inwardly the thread 8 will cut into the flat surfaces 4 and hence the bore of the shell will be tapped, and the screw will finally be firmly held by the shell. As the screw travels inwardly, the shell will expand and the projections will break (see dotted lines 9, Fig. 1). The projections 5 and 6 are placed in the shell for the purpose of preventing the screw from backing off and thus cause it to cut its way into the material of the shell. The projections are made comparatively thin in order that they will break after a little strain is placed thereupon by the inwardly traveling screw.

To prevent the shell from rotating while the screw 7 is being rotated, I provide the shell 1 with exterior oppositely disposed teeth or projections 10. The teeth or projections 10 will dig into the wall of the opening 11 of the support 12, when the shell is expanded.

The hexagonal wall of the bore of the shell provide a surface into which the thread 8 will easily cut. To take care of the taper of the screw I preferably make the innermost projection 6 somewhat longer than the projection 5.

Having now described my invention in detail what I claim and desire to secure by Letters Patent is:

1. An expansion bolt shell which is longitudinally split for the greater part of its length provided with a tapered bore and having at intervals discontinuous frangible projections adapted to engage the threads of an expanding screw.

2. An expansion bolt shell consisting of a body-portion slotted longitudinally throughout the greater part of its length and provided with a tapered bore, and projections within said bore and crossing said slots adapted to engage the thread of a screw.

3. An expansion bolt shell consisting of a body portion slotted longitudinally throughout the greater part of its length and provided with a tapered bore, and frangible projections within said bore and crossing said slots adapted to engage the threads of a screw.

4. An expansion bolt shell consisting of a body portion slotted longitudinally for the greater part of its length and provided with a tapered bore having an angularly shaped wall, frangible projections within said bore and crossing said slots adapted to engage the threads of a screw.

5. An expansion bolt shell consisting of an expansible body of relatively soft material having a tapered bore, and frangible projections within said bore and crossing said slots adapted to engage the thread of a screw, said projections being integral with said shell.

6. An expansion-bolt shell divided into a plurality of members by longitudinal slots, and frangible connections crossing said slots.

7. An anchor-bolt shell divided into a plurality of members by longitudinal slots and provided with breakable integral parts crossing the said slots and connecting said members.

8. An anchor-bolt shell divided into a plurality of members by longitudinal slots and provided with breakable integral parts crossing the said slots and connecting said members across all of said slots.

9. An anchor-bolt shell divided into a plurality of members by longitudinal slots and provided with breakable parts which cross the slots, connect said members on the inner face of the shell and are adapted to engage the threads of a screw, inserted in said shell.

Signed at New York city, N. Y. this 20 day of January 1914.

HEYMAN ROSENBERG.

Witnesses:
  EDWARD A. JARVIS,
  MAURICE BLOCK.